Dec. 18, 1962 G. GIESECKE 3,069,627

SELF-CLOCKING SYSTEM FOR READING PULSES SPACED AT VARIABLE MULTIPLES OF A FIXED INTERVAL

Filed Aug. 28, 1958 3 Sheets-Sheet 1

INVENTOR
G. Giesecke

BY Robert Harding Jr.
ATTORNEY

INVENTOR
G. Giesecke

BY Robert Harding Jr.
ATTORNEY

Dec. 18, 1962 G. GIESECKE 3,069,627

SELF-CLOCKING SYSTEM FOR READING PULSES SPACED AT VARIABLE MULTIPLES OF A FIXED INTERVAL

Filed Aug. 28, 1958 3 Sheets-Sheet 3

INVENTOR
G. Giesecke

BY Robert Harding Jr

ATTORNEY 3,069,627

SELF-CLOCKING SYSTEM FOR READING PULSES SPACED AT VARIABLE MULTIPLES OF A FIXED INTERVAL

Günter Giesecke, Stuttgart, Germany, assignor to International Standard Electric Corporation, New York, N.Y., a corporation of Delaware Filed Aug. 28, 1958, Ser. No. 757,767
Claims priority, application Germany Sept. 13, 1957
12 Claims. (Cl. 328—34)

Figure 1:
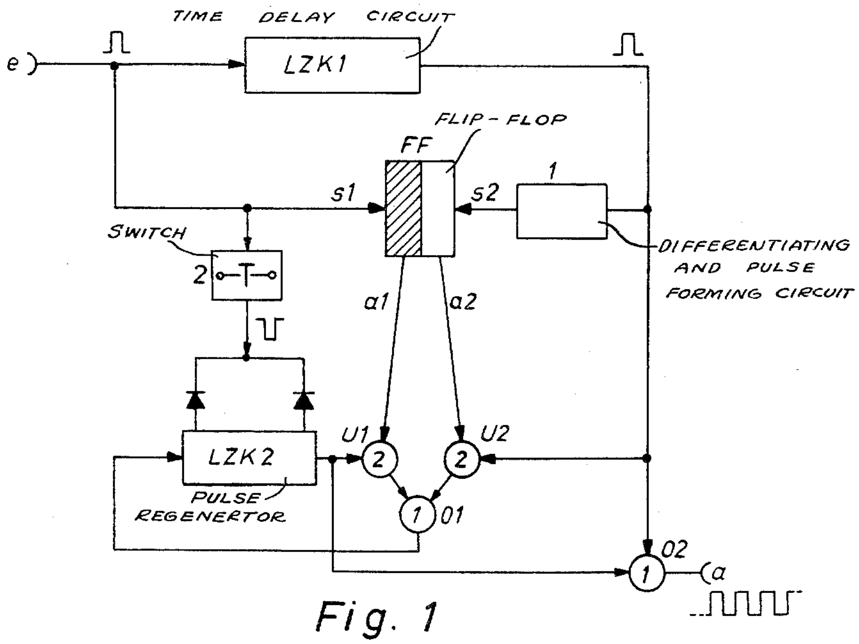

This invention relates to a method of producing clock pulses from a more or less irregular train of information pulses which is particularly suitable for the reading of informations which are stored on magnetizable record means.

For determining the presence or absence of information pulses the train of information pulses is compared with a train of clock pulses following at equal time intervals. These trains of pulses have to be synchronized. For this reason the clock pulses have previously been derived from a special clock track which is recorded in parallel with one or more information tracks on the record means. It has also been proposed to derive the clock pulses from the information track itself. To this end one conventional arrangement for self-clocking is provided with two oscillators operating towards one common output, one being blocked and the other unblocked at any given instant, the oscillators operating alternately in response to successive information pulses. Such an arrangement, however, bears the disadvantage that a considerable investment in circuitry is required in view of the two oscillators, for effecting the subsequent pulse-shaping. In addition thereto special time-delay arrangements have to be made because of the phase tolerances.

These disadvantages are avoided according to the invention by means of a self-clocking reading system for trains of pulses stored in series, in that a first clock pulse is triggered by each information pulse appearing in a reading channel via a time-delay element whose time-delay is adapted to the medium scanning speed, said first clock pulse being fed either directly or indirectly to an output, and in that a pulse generator is switched on simultaneously by each first clock pulse for feeding further clock pulses to the output, but which generator is switched off by the next successive information pulse and is only switched on again after the aforementioned time-delay by the first clock pulse corresponding to the last information pulse.

An arrangement for carrying out the inventive reading method is appropriately designed in such a way that a flip-flop circuit is used as storage device for the controlling of the pulse regenerator, the one control lead of the flip-flop circuit being connected with the input, while the other control lead thereof is connected with the output of the time-delay circuit, so that the flip-flop circuit will be tilted by the information pulses for the period of the time-delay into its one position, and by the delay pulses into its other position, in which it will remain until the arrival of the next successive information pulse, and in which position it serves to free the pulse regenerator. Advantageously a first delay line may be provided as a time-delay element, and a second delay line may be provided as a pulse regenerator with a feedback path, which delay lines, if so required, are connected in series with pulse shapers. Under the control of the flip-flop, via gating circuits, either the closing of the feedback path or the connecting of the input of the second delay line to the output of the first one will be effected, as will be explained hereinafter with reference to the accompanying drawings.

By the employment of delay lines, a high frequency stability can be achieved, so that such an arrangement is particularly suitable for cases in which the information pulses appear at a low repetition rate only.

However, in cases of trains of information pulses having a higher pulse density the circuitry may be substantially simplified. In such cases it is appropriate to provide a monostable multivibrator as a time delay element, and a multivibrator producing a rectangular output voltage as a pulse regenerator and having its frequency adapted to the medium scanning velocity. The method is equally well applicable to non-return-to-zero types of recordings.

Figure 2:
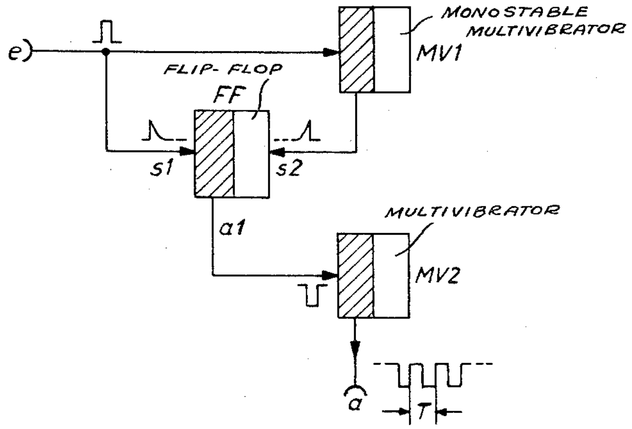
Figure 3:
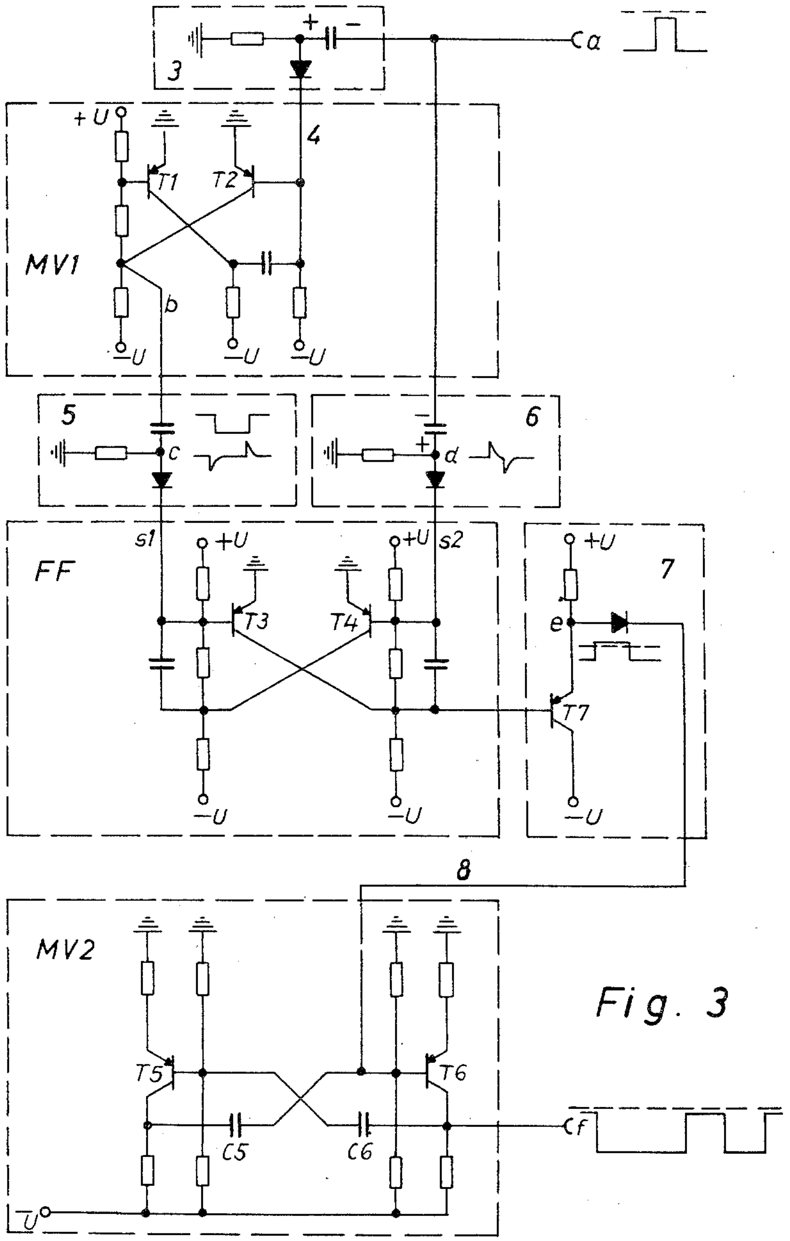
Figure 4:
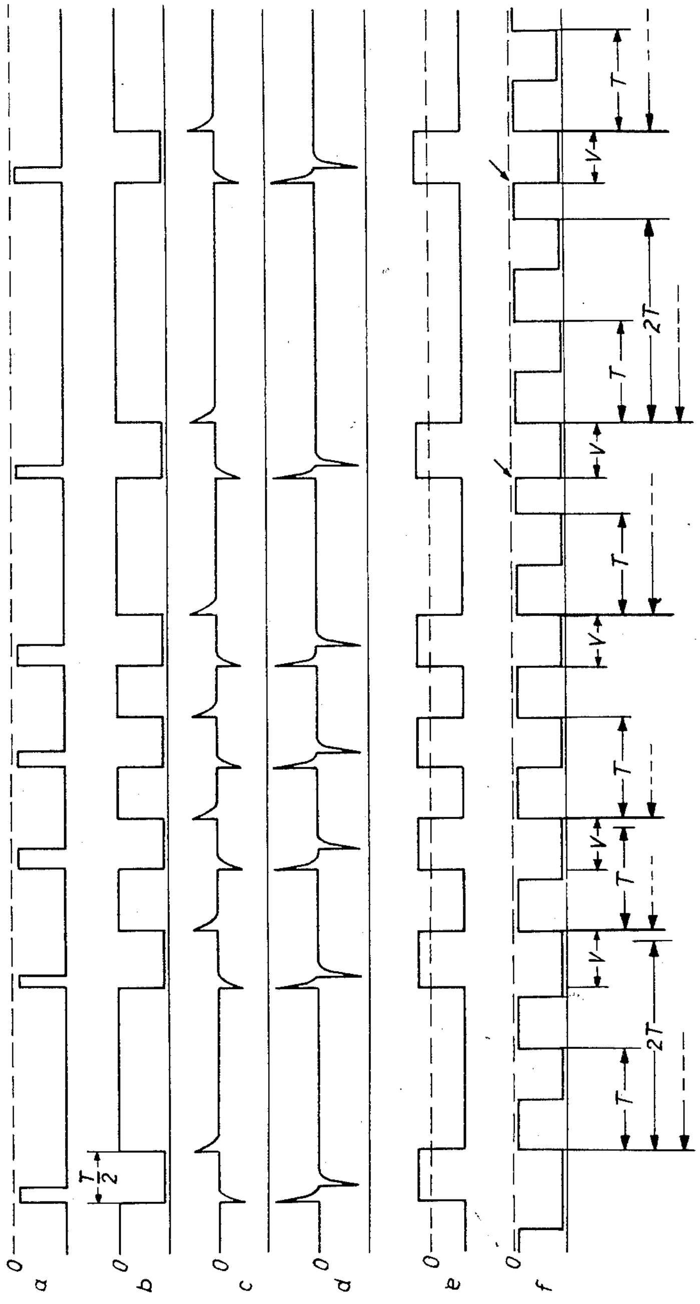

Further details of the invention will now be described with reference to the exemplified embodiments shown in the copending drawings, in which:

FIG. 1 shows the basic circuit diagram of an arrangement incorporating delay lines, FIG. 2 shows an arrangement employing multivibrators, FIG. 3 shows a transistorized multivibrator circuit, and FIG. 4 shows a wave-form diagram relating to the circuit arrangement as shown in FIG. 3.

As a first embodiment an arrangement employing delay lines will now be described. FIG. 1 shows the corresponding basic circuit diagram. In this figure the first and the second delay lines, acting respectively as the time-delay element and pulse regenerator, are indicated respectively by LZK1 and LZK2. The flip-flop circuit FF is connected to the input and output of LZK1 via the control leads *s*1 and *s*2. By means of a pulse on *s*2, the flip-flop FF will be tilted into its one position—the releasing position (shown sectioned)—and by a pulse on *s*1, it will be tilted into its other position—the blocking position (shown open). An incoming pulse, therefore, will cause the flip-flop FF to assume its blocking or right-hand position, whereupon the delayed pulse from the time delay circuit LZK1, delivered over lead *s*2 will cause the flip-flop to assume its releasing or left hand position. The outputs of FF are denoted as *a*1 and *a*2 and are applied to the AND-gates U1 and U2. The output *a*1 serves the pulse regenerator by preparing the AND gate U1 for operation. The pulse regenerator consists of the delay line LZK2 and the feedback path extending via the AND-gate U1 and the OR-gate O1. Via the other input of the OR-gate O1, the output pulse of the first delay line LZK1 may be fed to the input of the second delay line LZK2. In FIG. 1 the gating circuits are shown as circles, i.e., the AND-gates as a circle containing the number 2, and the OR-gates as a circle containing the number 1. The inputs are marked by the points of arrows.

The arrangement, according to FIG. 1, is made in such a way that the feedback path is completed via the AND-gate U1 the first input of which is connected to the output of the second delay line, as well as via the OR-gate O1, when the flip-flop has assumed its releasing position. The second input of the AND-gate U1, then, is connected with the releasing output *a*1 of the flip-flop FF. When the flip-flop FF is in its releasing position, producing an output on "*a*1," a pulse appearing at the output of delay line LZK2 may pass through AND gate U1 and OR gate O1 to the input of the delay line, so that the pulse may keep circulating through the delay line. Each time a pulse appears at the output it is delivered through OR gate O2 to the output "*a*" of the circuit. The delayed pulses from LZK1 may be fed to the second input of the OR-gate O1. To this end, as will be seen from the showing of FIG. 1 another AND-gate U2 is inserted, between the output of the first delay line LKZ1 and the second input of the OR-gate O1. The second input of gate U2 is connected with the blocking output $a2$ of the flip-flop FF, so that the further AND-gate U2 is only unblocked after the flip-flop has assumed its blocking position (i.e. when the feedback path is interrupted). The outputs of both delay lines are connected via the OR-gate O2 to the output "$a$" for the clock pulses.

For ensuring the reliability of function of the arrangement, it is important that the output pulse from the first delay line LZK1 acts first of all upon the second delay line LZK2, and only thereafter effects the tilting of the flip-flop from the blocking position to the releasing position. For safeguarding the order of sequence of these switching functions, it is advisable to utilize the trailing edges of the output pulse from LZK1 for the tilting of the flip-flop. As is indicated by the dashline block in FIG. 1, a differentiating and pulse-shaping element 1 is inserted in the control lead $s2$, between the output of the first delay line and the flip-flop for delivering these trailing edges to the flip-flop.

In operation, an incoming pulse at "$e$" will cause the flip-flop FF to be tilted to its right-hand or blocking position, thus breaking the feedback path of the delay line LZK2 at the AND gate U1. The delayed pulse, emerging from the delay line LZK1 will pass through the OR gate O2 to appear at "$a$" as the first clock pulse in the series.

At the same time the delayed pulse from delay line LZK1 will pass through AND gate U2 and OR gate to the input of delay line LZK2. This pulse will also be differentiated in the circuit 1 and the pulse produced by the trailing edge will cause flip-flop FF to be tilted back to its releasing or left-hand position when its output $a1$ will prepare AND gate U1. The delayed pulse from delay line LZK2 will thus be able to circulate via the feedback path through the delay line, producing another clock pulse at the output "$a$" each time it does so.

According to the invention, a further increase in functional reliability is attainable in that the pulse regenerator is switched off not only by the interruption of the feedback path via U1, but also by the switching off of the delay line, e.g. consisting of LC-circuits, because of the discharge of the capacitors. To this end, as is likewise denoted in FIG. 1, the second delay line LZK2 is connected via decoupling diodes with a discharge switch 2, which is directly controlled by the information pulses at the input of the first delay line LZK1.

As a further embodiment, an arrangement including multivibrators will now be described with reference to the showing of FIG. 2. This arrangement is made in such a way that a monostable multivibrator MV1 is used as a time-delay element and a multivibrator MV2 with a rectangular output voltage is used as a pulse regenerator, and is adapted with respect to its frequency to the medium scanning velocity. For the control purpose, as in the example described hereinbefore, a flip-flop circuit FF is provided whose one control lead $s1$ is connected with the input for information pulses, and whose other control lead $s2$ is connected with the output of the monostable multivibrator MV1. The multivibrator MV2 is connected to the releasing output of the flip-flop FF and the clock pulses appear at its output.

If the information pulses appear at the input $e$ at time intervals T or as integer multiples of T, then the multivibrator MV2 is to be tuned to the period T, and the multivibrator MV1 appropriately to the restoring time $T/2$.

An incoming pulse at "$e$" will cause flip-flop FF to tilt to its right-hand blocking position, thus stopping the operation of multivibrator MV2 by cutting off the input over $a1$. At the same time monostable multivibrator MV1 is tilted to its unstable or right-hand position for a time $T/2$. When MV1 restores to its left-hand or normal position, a pulse over $s2$ tilts flip-flop FF to its releasing or right-hand position which delivers a potential over $a1$ to start multivibrator MV2 to produce the clock pulses at "$a$."

A transistorized multivibrator circuit for performing the inventive reading method is shown in FIG. 3 of the drawings. The multivibrators MV1 and MV2, as well as the flip-flop circuit, are arrangements designed in the conventional manner, each comprising two transistors of the pnp-type, one being blocked while the other one is unblocked. In FIG. 3 these transistors are indicated by the references T1 . . . T6. MV1, MV2 and FF are operated by the operating voltages +U and −U. The inputs of MV1 and FF are preceded by coupling elements 3, 5, and 6, only conductive in the input direction, and consisting of a T-circuit connected to ground and composed of a capacitor, a diode and a resistor. The output of FF which is connected to the collector electrode of transistor T3 is applied via a matching transformer 7 and the line 8 to MV2. The matching transformer 7 comprises the transistor T7 in a grounded collector arrangement, as well as a decoupling diode at the output side, and is operated by the operating voltages +U and −U.

The mode of operation of the arrangement according to FIG. 3 is appropriately explained in conjunction with the waveform diagram as shown in FIG. 4. In the absence of information pulses the input line $a$ is held at a negative operating voltage, so that the capacitors in the coupling elements 3 and 6 will be charged negatively with respect to $a$. This state may be briefly called the normal condition. In this normal condition the transistor T1 in MV1 is blocked, and the transistor T2 is conductive. The capacitor in MV1 is held by the base current of T2 at the voltage U. In the same way, and in the normal condition of FF, the transistor T3 is blocked and the transistor T4 conductive. Accordingly, the voltage drop across the collector resistance of T3 is so small that the base current from the subsequently arranged matching transformer 7 can be accepted. Thus the transistor T7 is conductive in the normal condition and, consequently, the diode in 7 is biased in the backward direction. On account of this the multivibrator MV2 is unblocked, so that the transistors T5 and T6 are alternately conductive and a train of clock pulses is produced at "$f$." For example, if T5 is conductive then T6 will remain blocked until the capacitor C5 is recharged. After the recharging of C5 has made a sufficient progress T6 will become conductive, and due to the voltage drop across the collector resistance of T6, which is transferred via the capacitor C6 to the base of T5, the transistor T5 will be blocked. Thereupon the capacitor C6 will be discharged and T5 will become conductive again, simultaneously effecting the blocking of T6, and so forth. The output $f$ is connected to the collector of T6 at which output rectangular voltage pulses can be read as clock pulses, which are capable of controlling e.g. an amplifier circuit.

If now a positive voltage pulse appears at the input $a$, or in case $a$ is applied for a short period and in a low-ohmic manner to ground by the information pulses, then, the base of T2, via the coupling element 3, and the base of T4, via the coupling element 6 are suddenly raised to a positive potential, so that a blocking will be effected by T2 in MV1 and by T4 in FF. In the blocking state of T2 the transistor T1 will become conductive, and MV1 will remain in this condition until the capacitor, which is connected with the base of T2, is recharged again to such an extent that T2 will again become conductive and T1 is blocked again. Accordingly, MV1 will return to normal after some time.

Together with the tilting of MV1 and by the input pulse applied to $a$, via 6, T4 in FF will also be blocked and T3 will become conductive. This condition of FF is a stable one. By means of the collector current of T3, and the corresponding voltage drop across the collector resistance, T7 in 7 will be blocked. MV2 will now be controlled via the diode in 7 and via line 8 so that C5 is charged positively and T6 is blocked simultaneously. Thus MV2 is held with T5 conducting and T6 non-conducting.

As soon as MV1 is tilted back again to T2 conducting and T1 blocked, a positive pulse will be transferred via the line *b* and the coupling element 5 to the base of T3. T3 is thereby blocked and T4 becomes conductive again, which causes the unblocking of T7 in 7 and, consequently, the decoupling via the diode in 7, so that MV2 will be released again. The base of T6 will become negative again and MV2 will be allowed to oscillate without delay.

The pulse diagram in FIG. 4 shows the sequence of potentials at the points *a* . . . *f* indicated in FIG. 3. First of all it will be seen that the leading edges of the incoming information pulses "*a*" are directly transferred via points *b*, *c*, and *d* to *e* in the transformer 7. Due to the positive edges at point *e*, MV2 will be switched off, that is, T6 will be blocked provided that it had not been blocked already. Consequently, point *f* is or will become strongly negative when the positive edge of the pulse appears at point *e*.

The transfer or connecting-through of the positive edges of the pulses from point *e* will be distinctly visible in FIG. 4 at the points of the curve *f* indicated by arrows.

In the described example, MV1 will return to its normal condition after a delay *T*/2, and MV2 will oscillate at the clocking period T. With the delay *T*/2 the negative pulse edges at point *b* will be followed by positive edges which connect themselves through without delay via points *c* and *e* as positive edges to the output point *f*. As is shown in FIG. 4 by the intersections of the periods T or the multiples thereof with the delay-times V, (the times during which MV2 is prevented from oscillating), the reading method, according to the invention, is carried out in such a way that the leading edges of the information pulses determine the initial points of the delay-times V, and the end points of the delay-times V determine the initial points of the periods, hence respectively determine the position of the trailing edges of the negative clock pulses.

In the pulse diagram, unfavourable conditions were assumed insofar as such a high pulse density was assumed to exist that the input pulses appear to be displaced by *T*/4 with respect to their scheduled time-line position. From this the synchronization of the clock pulses will be clearly recognized.

Of course, for writing on the recording medium, the multivibrator may be employed as a clocking or timing device. However, the control device necessary to this end has not been inserted in the circuit diagram, because it may be of any conventional type.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A self-clocking system for reading trains of pulses spaced at variable multiples of a fixed interval comprising a source of pulses spaced at variable multiples of a fixed interval, a delay circuit coupled to said source, pulse train producing means coupled to said delay circuit and capable of producing a train of clock pulses spaced at said fixed interval in response to a pulse issuing from said delay circuit, said train beginning at a predetermined time after the issuance of said pulse from said delay circuit, and means coupled to said source for disabling said pulse producing means in response to each said pulse issuing from said source while the said disabling pulse traverses said delay means.

2. A self-clocking reading system, as defined in claim 1, in which the pulse-train producing means comprises a pulse regenerator, a time delay circuit, means for applying information pulses which appear on the reading channel to said time delay circuit, means for operating said pulse regenerator by the output of said time delay circuit, and means for connecting the output of said pulse regenerator to the output circuit.

3. A self-clocking reading system for trains of pulses stored in series comprising a reading channel; an output circuit, pulse-train producing means responsive to an information pulse appearing on said reading channel for producing a train of pulses commencing at a predetermined time after the appearance of said information pulse said means including: a pulse regenerator, a time delay circuit, means for applying information pulses which appear on the reading channel to said time delay circuit, means for operating said pulse regenerator by the output of said time delay circuit, and means for connecting the output of said pulse regenerator to the output circuit; and means responsive to a second information pulse appearing on said reading channel for disabling said pulse-train producing means; said disabling means comprising a flip-flop circuit for controlling the pulse regenerator, said flip-flop circuit serving as a storage device and having one control lead connected with the reading channel and another control lead connected to the output of the time delay circuit, so that said flip-flop circuit is tilted into its first position by an information pulse appearing on said reading channel, and into its second position by the delayed pulse from said time delay circuit, said pulse regenerator being enabled when said flip-flop circuit is in said second position and disabled when said flip-flop circuit is in its first position.

4. A self-clocking reading system, as claimed in claim 3, in which the pulse regenerator is a delay-line with a feedback path.

5. A self-clocking reading system, as claimed in claim 4, in which the feedback path is closed via an AND-gate, which has a first input connected to the output of the delay line and a second input connected with the output of the second position of the flip-flop circuit, the feedback also being closed via an OR-gate having a first input connected to the output of said AND-gate and a second input connected to the output of the time delay circuit, said closure being effected after said flip-flop circuit has been tilted into its second position.

6. A self-clocking reading system, as claimed in claim 5, in which a second AND-gate is connected between the output of the time delay circuit and the second input of the OR-gate, the second input of said second AND-gate being connected with the output of the first position of the flip-flop circuit, so that said second AND-gate is only unblocked after said flip-flop circuit has been tilted into its first position.

7. A self-clocking reading system, as defined in claim 6, further comprising a further OR-gate, the outputs of both the time delay circuit and the delay line being applied via said further OR-gate to the output circuit for clock pulses.

8. A self-clocking reading system, as defined in claim 4, in which the time delay circuit and the dellay line are connected in series with pulse-shapers.

9. A self-clocking reading system, as defined in claim 4, in which the connection extending between the output of the time delay circuit and the flip-flop circuit includes a differentiating and pulse-shaping element.

10. A self-clocking reading system, as defined in claim 9, further comprising switch means connected to the pulse regenerator and to the reading channel and responsive to an information pulse appearing thereon for disabling said pulse regenerator.

11. A self-clocking reading system, as defined in claim 10, in which the switch means comprises decoupling diodes connected to the delay line and a switch for normally blocking said diodes and for unblocking them in response to an information pulse.

12. A self-clocking reading system, as defined in claim 3, in which the time delay circuit is a monostable multivibrator and the pulse regenerator is a multivibrator having a predetermined frequency with respect to the mean scanning velocity and produces a rectangular output voltage.

References Cited in the file of this patent

UNITED STATES PATENTS

| | | |
|---|---|---|
| 2,145,332 | Bedford | Jan. 31, 1939 |
| 2,524,710 | Miller | Oct. 3, 1950 |
| 2,700,155 | Clayden | Jan. 18, 1955 |
| 2,779,933 | Bradburd | Jan. 29, 1957 |
| 2,807,003 | Alrich | Sept. 17, 1957 |
| 2,847,568 | Saucedo | Aug. 12, 1958 |
| 2,851,596 | Hilton | Sept. 9, 1958 |
| 2,875,336 | Williams | Feb. 24, 1959 |